L. GUTMANN.
PULLEY COVERING OR FACING.
APPLICATION FILED MAY 21, 1914.
1,211,938. Patented Jan. 9, 1917.
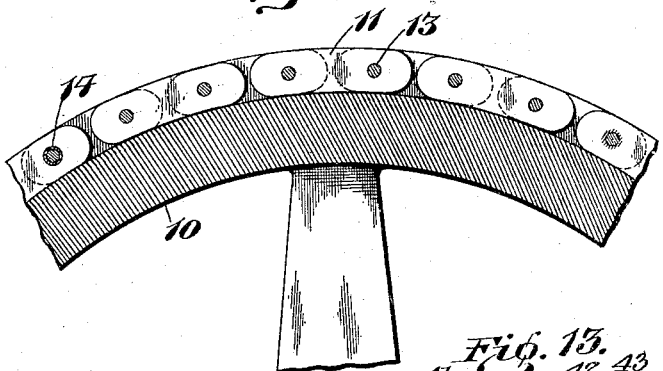
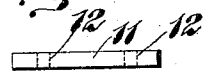
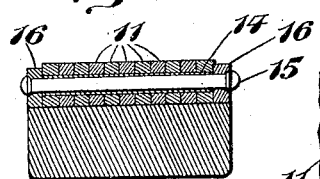
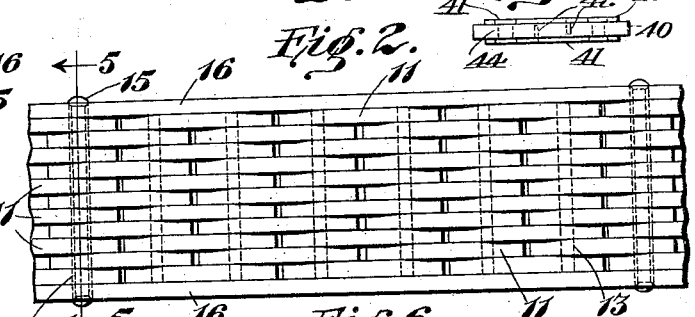
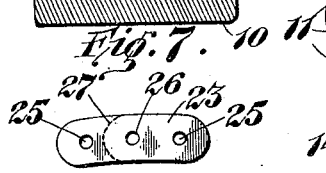
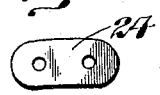
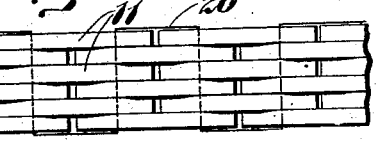
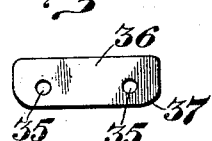
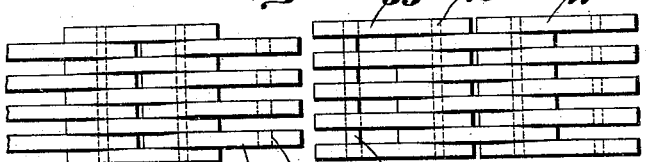
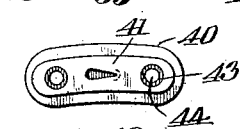
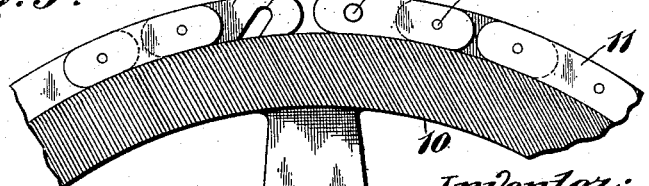
Attest:
Charles A. Becker.
Arthur B. Cremer.
Inventor:
Ludwig Gutmann,
by John H. Bruninga
His Attorney

UNITED STATES PATENT OFFICE.

LUDWIG GUTMANN, OF ST. LOUIS, MISSOURI.

PULLEY COVERING OR FACING.

1,211,938. Specification of Letters Patent. Patented Jan. 9, 1917.

Continuation of application Serial No. 722,915, filed September 28, 1912. This application filed May 21, 1914. Serial No. 840,003.

*To all whom it may concern:*

Be it known that I, LUDWIG GUTMANN, a citizen of the United States, and residing at St. Louis, in the State of Missouri, have invented certain new and useful Improvements in Pulley Coverings or Facings, of which the following is a specification.

This invention relates to pulleys, and more particularly, to rims or coverings therefor.

This application is a continuation of my co-pending application, Serial No. 722,915, filed September 28, 1912, as to subject matter which is common to the two applications.

In every industry, it frequently happens that it is desirable to increase the speed of a tool or counter shaft, or to obtain a greater tractive effect between the belt and the pulley. For speed increase, the question resolves itself into the buying of a new pulley. In order to obtain greater tractive effect, a different pulley having a more suitable rim must be bought, or the co-efficient of friction must be increased in some other manner, as by providing a pulley facing having a higher co-efficient of friction.

The pulley facings heretofore suggested and applied have been of the individual type, and were made and finished on the premises where the pulley was used. It required individual fitting for length, width and anchoring, and special skill in applying. The cost of some of these facings is higher than a new pulley, since expensive material, involving considerable waste, was cut up into rings and applied. Such wasteful and costly change is only warranted when there is no time for other changes, or when the resulting consequences due to delay far outweigh such expenditures.

The objects of this invention, therefore, are, to provide a pulley covering or facing which will overcome the defects of the present construction, at the same time retaining its advantages, and possessing additional advantages; which can be readily applied to a pulley, and which has a universal application to pulleys of different diameters and widths.

Further objects will appear from the detail description taken in connection with the accompanying drawings, in which:

Figure 1 is a vertical detail section through a pulley rim, showing the facing applied thereto, Fig. 2 is a plan view of Fig. 1, Fig. 3 is a detail side elevation of one of the links or laminations, Fig. 4 is a plan view of Fig. 3, Fig. 5 is a section on the line 5—5, Fig. 2, Fig. 6 is a plan view of a section of a pulley covering, illustrating another embodiment of this invention, Figs. 7 and 8 are details of different forms of links, Fig. 9 is a vertical section through a pulley rim, illustrating another embodiment of this invention, Fig. 10 is a plan of Fig. 9, Fig. 11 is a detail showing another form of link, and Fig. 12 is a side elevation of still another form of link, Fig. 13 is a plan of Fig. 12.

Referring to the accompanying drawings, and more particularly, to Figs. 1 to 5 inclusive, 10 designates a pulley rim, which may be of wood, iron, or even of stamped sheet metal, as shown and described in the application referred to. This rim is adapted to receive the pulley covering which forms the subject matter of this invention. This pulley covering comprises a series of sectional laminations or links 11, perforated, as shown at 12. These laminations may be formed of leather, canvas, cloth, or paper, and, in view of the fact that they are comparatively small, waste material may be used. A series of these links or sectional laminations are interlinked and assembled in overlapping relation by rivets or wire 13, so as to form together a chain-like and flexible structure. Any number of these sectional laminations can be built up to form a covering of any desired length or width. This covering can be laid on the pulley rim and secured thereto by cementing or in any other suitable manner. If desired, certain of the rivets 13 may be replaced by hollow rivets 14 to receive rods or wires 15 which may be passed through metal end rings 16, or through the side flanges of the pulley rim where such rims are provided. These rods or wires 15 then act as stays, and also to hold the end rings in place where such end rings are used. In practice, the hollow rivets will be placed at regular intervals along the covering. In view of the fact that the covering is cemented or glued to the pulley rim, the rods will, ordinarily, be unnecessary.

The links or sectional laminations 11 may be secured together by thread, wire, or leather 20 passed zig zag therethrough, as shown in Fig. 6.

For pulleys of large diameter, the covering can generally be stretched enough so that a rivet or wire can be slipped through the holes 12 of the end links. It is, however, desirable, in some cases, to provide for adjustability. For this purpose, extra links 23, Fig. 7, or 24, Fig. 8, are provided. The link 23 is provided, in addition to the holes 25, with one or more intermediate holes 26. In a case, therefore, where a shorter link must be provided, this link can be cut off on a line 27 so as to form such a short link, as shown in Fig. 8, or this short link, Fig. 8, may be provided in the first instance.

Figs. 9 and 10 show another form of end link connection, in which the links 30 are slotted, as shown at 31, to slip over a cross pin 32 in the end links 33. The cross pin 32 is preferably larger than the rivets or wires 13 of the other links 11, so as to form a good bearing, and the end links 30 are preferably constructed of metal, while the end links 33 can be made of the same material as the other links 11. In applying this form of covering, the ends are brought together and the hooked end links 30 hooked over the cross pin 32. It will be understood, of course, that this covering is cemented or glued on the pulley rim in the same manner as in the other constructions.

The links may have the perforations 12 positioned medially of the depth of the link, but these perforations 35 may be placed nearer the lower edge of the link 36, as shown in Fig. 11, so as to permit the covering to be turned down, if so desired. The lower corners 37 of the link are rounded, as shown in Fig. 11, so as to permit flexure of the covering.

Where a material such as paper or cloth is used, it may be desirable to reinforce the same with another material. Such a link is shown in Figs. 12 and 13. In these figures, 40 designates a body or core, which may be formed of laminæ of paper, cloth, canvas, or any other suitable material, which is reinforced or clad on one or both faces with plates 41 of metal or any other suitable material having a high shearing strength. Where metal is used, this plate 41 may be provided with struck up lugs 42 for attaching the plates to the body or core 40. The apertures 43 in the plates are preferably made larger than the apertures 44 in the core so as to allow for slight elongation of the holes 44 when the covering is stretched over the pulley rim. The plates 41 are preferably made smaller than the core 40. It will be understood that the body or core of the link may be reinforced with any other suitable material, such as, leather or strong cloth. In the latter case, a composite sheet, made up of a center sheet and clad with sheets of reinforced material cemented together can be cut up into links.

In all of the constructions heretofore described, the laminations are joined side by side with their edges exposed to form a flexible chain-like pulley facing. This pulley facing can be secured to the pulley rim with glue, and the interstices between the links or sectional laminations can then be filled with glue, filler, rubber, or any other suitable composition, so as to form an uninterrupted pulley facing. This pulley covering can be applied to any pulley, and when in position will form a covering having not only great strength and durability, but also a high co-efficient of friction. The covering can be kept in stock and used on pulleys of different diameters and different widths of faces. In all of these constructions, the sectional laminations or links may be subjected to a preliminary treatment with an impregnating substance, such as, glues, varnishes, gums, rubber, balata, or coal tar or its products, and this treatment may be given the laminations or links before or after they are assembled to form the covering. These laminations or links may individually, as well as collectively, when assembled, be subjected to pressure between rollers so as to condense the fibers and increase their strength and durability. The individual laminations may also be built up of a number of layers of leather, paper, cloth, or canvas, compressed and condensed to form composite links or laminations, and this compressed lamination or link may also be subjected to treatment.

This invention results in a pulley covering having all the desirable characteristics that a pulley covering should have. In view of its great flexibility, it will cling closely to the pulley and can, therefore, be firmly secured in position. As a matter of fact, the frictional engagement between the pulley and the covering will ordinarily be sufficient to hold it in place. It has also a high coefficient of friction and, therefore, results not only in a saving of belts, but also in a saving of bearings. It has a strength in a direction where the greatest strength is necessary, namely, in a radial direction, and will, therefore, resist crushing. In view of the fact, however, that the covering engages the entire circumference of the pulley and can be glued thereto over its entire circumference, the tensile strength does not enter and can, therefore, be small as distinguished from belting. This flexible construction of the pulley covering, therefore, results not only in greater adhesion, but also in greater flexibility. In view of the fact that the covering is made up of short pieces, waste material can be used, and the resultant covering, will, therefore, be cheap, even if a comparatively expensive material, like leather, is used. Moreover, the covering can, on account of its flexibility and sectional construction, be applied to pulleys of different diameter, so that only a few sizes of covering need be kept in stock.

It is obvious that various changes may be made in details of construction without departing from the spirit of this invention, and it is, therefore, to be understood that this invention is not to be limited to the specific construction shown and described.

Having thus described the invention, what is claimed is:

A pulley having an applicable rim covering comprising a series of circumferentially extending links flexibly joined together endwise to form a flexible pulley facing.

In testimony whereof I affix my signature in the presence of these two witnesses.

LUDWIG GUTMANN.

Witnesses:
J. H. BRUNINGA,
GERTRUDE A. HEYMANN.

Copies of this patent may be obtained for five cents each, by addressing the "Commissioner of Patents, Washington, D. C."